United States Patent
Usry

[15] 3,703,185
[45] Nov. 21, 1972

[54] FORCE BALANCING FLAPPER VALVE
[72] Inventor: Joe D. Usry, Arlington, Tex.
[73] Assignee: E-System, Inc., Dallas, Tex.
[22] Filed: April 7, 1970
[21] Appl. No.: 26,322

[52] U.S. Cl....................................................137/82
[51] Int. Cl..........................G05d 16/20, F15b 5/00
[58] Field of Search.............137/82, 83, 625.62, 612

[56] References Cited

UNITED STATES PATENTS

| | | | |
|---|---|---|---|
| 3,385,309 | 5/1968 | Bains | 137/625.62 X |
| 2,939,430 | 6/1960 | Westbury | 137/82 X |
| 3,054,416 | 9/1962 | Lucien | 137/625.62 X |

*Primary Examiner*—Alan Cohan
*Attorney*—Richards, Harris & Hubbard

[57] ABSTRACT

Flapper valves of the type described may be used in a roll control thruster program for rocket maneuvering and the like where relatively small torque motor valve actuators are preferred. The flapper valve inlet is split into two nozzle passages feeding oppositely into a central valve chamber or cavity which contains a pivotally mounted flapper. A conventional pair of oppositely directed outlet passages or ports communicate with the chamber and are opened and closed by the movable flapper. The upstream or inlet section of the flapper is provided with specially shaped poppets to produce force moments which along with force moments produced on the flapper at the outlet ports has a tendency to center the flapper. The upstream or inlet portion of the flapper has an outline such as to effect a reduction of the reaction force of a fluid jet impinging on the upstream section of the flapper. Preferably, the poppets on the upstream section of the flapper are shaped to make the net area of the two upstream nozzle orifices constant for any position of the movable flapper.

9 Claims, 5 Drawing Figures

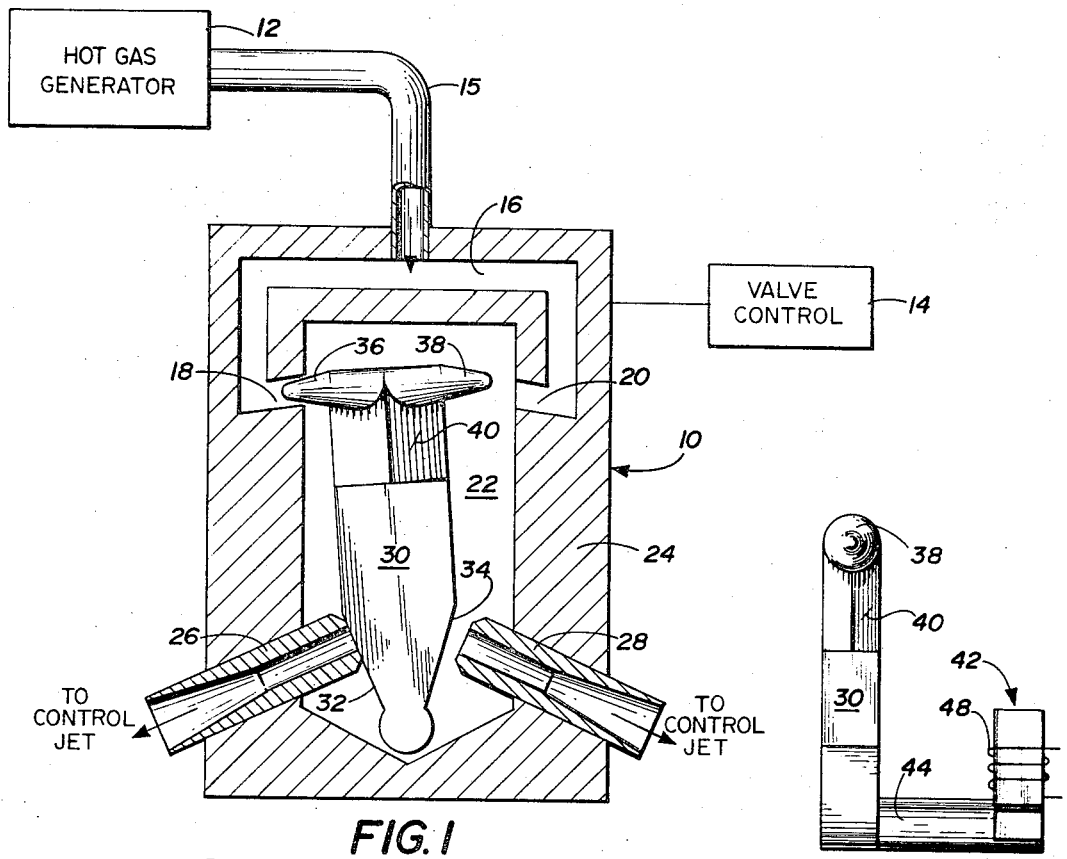
FIG.1
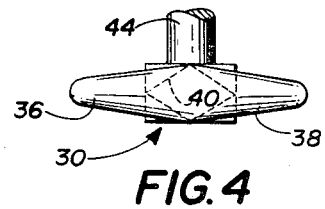
FIG.4
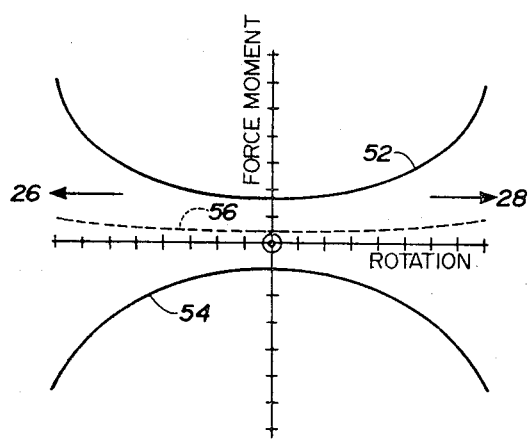
FIG.5
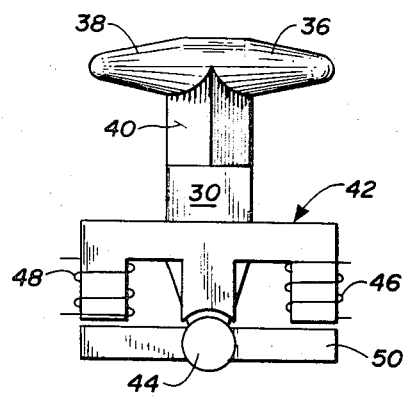
FIG.2
FIG.3
INVENTOR:
JOE D. USRY
Richards, Harris & Hubbard
ATTORNEY 3,703,185

FORCE BALANCING FLAPPER VALVE

This invention relates to a flapper valve, and more particularly to a flapper valve having balancing forces to produce a self-centering of the flapper.

Although the flapper valve of the present invention is useful in many fluid control systems, it finds particular utility in a system for controlling the attitude of a rocket. Roll control nozzles located on an air or space borne vehicle are employed to control the attitude of the vehicle in the roll planes by expelling gases from the nozzles to counteract the effects of movement in the roll plane caused by undesired external force applications. One of the critical parameters in the operation of a roll control system employing jet nozzles is that the gases be expelled from the nozzle only in a predetermined amount sufficient to provide the correcting force. Thus, the valve for controlling the expelled gases must respond quickly to avoid over-correction. Further, in an air or space borne vehicle available power and mounting area are at a premium, thereby necessitating the use of small valve actuators to provide the quick and accurate response for valving hot gases.

An object of the present invention is to provide a fast-acting flapper valve having a self-centering flapper. Another object of this invention is to provide a flapper valve requiring a smaller actuator for a given size valve by use of a self-centering flapper. A further object of this invention is to provide a bi-stable flapper valve having an upstream section and a downstream section each producing a force moment on a flapper in a direction to reduce the power requirements of the valve actuator. Still another object of this invention is to provide a flapper valve wherein reaction forces on the flapper are minimized to improve the valve response time and reduce actuator power requirements.

In accordance with one embodiment of the invention, the housing of a fluid control valve includes a cavity therein with an inlet or upstream section and an outlet or downstream section. Opposed inlet ports communicate with the cavity of the valve housing in the inlet section and provide a passage for fluid entering the valve. Opposed outlet ports communicate with the cavity of the valve housing in the outlet section and provide a passage for fluid flowing from the valve. A flapper is pivotally mounted in the cavity of the valve housing and provides controlled communication between the inlet ports and the outlet ports. Positioned in the fluid stream from the inlet ports are opposed shaped poppets as part of the flapper. Fluid impinging on these opposed poppets produces a force moment around the flapper pivot to cause a centering thereof against the force moment produced on the flapper by fluid flowing through the outlet ports.

In accordance with a more specific embodiment of the invention, the housing of a fluid control valve includes a cavity therein with an inlet section and an outlet section. A pair of opposed inlet ports each having a longitudinal axis lying in a common plane communicate with the cavity of the valve housing in the inlet section to provide a passage for fluid through the valve. Similarly, a pair of opposed outlet ports each having a longitudinal axis lying in the same plane as the opposed inlet ports communicate with the cavity of the valve housing in the outlet section to provide a passage for fluid from the valve. A flapper is pivotally mounted in the valve housing on an axis substantially perpendicular to the plane of alignment of the longitudinal axis of the inlet and outlet ports and provides controlled communication of a fluid between the inlet ports and the outlet ports. Opposed shaped poppets are formed as part of the flapper in a position such that the fluid emitting from the inlet ports produces a force moment around the flapper pivot to cause a centering thereof against the force moment produced on the flapper by fluid flowing through the outlet ports.

A more complete understanding of the invention and its advantages will be apparent from the specification and claims and from the accompanying drawings illustrative of the invention.

Referring to the drawings:

FIG. 1 is a schematic of a flapper valve of the present invention for valving hot gases to the control jets of an air or space vehicle;

FIG. 2 is a side view of the flapper of the valve of FIG. 1 including a valve actuator coupled to the flapper pivot shaft;

FIG. 3 is a view of the flapper of the valve of FIG. 1 and an E-core valve actuator;

FIG. 4 is a top view of the flapper of the valve of FIG. 1 illustrating a configuration for the upstream opposed poppets; and FIG. 5 is a plot of force versus the angular position of the flapper showing the torques produced by the upstream and downstream sections of the valve.

Referring to the drawings in which FIG. 1 illustrates a somewhat simplified system wherein a bistable flapper valve 10 controls the flow of gas to rocket control jets (not shown) from a hot gas generator 12 in accordance with control signals from a valve controller 14. The hot gas generator 12 may be any standard available generator and includes a fuel supply and a reaction chamber along with the necessary valving. In accordance with one feature of this invention, an inlet passage 16 joined to a pipe 15 in conjunction with the inlet ports 18 and 20 provides the neccessary back pressure to stabilize the gas generator 12. In applications where stabilization of the fluid supply source is not required, the inlet passage 16 may take other forms to minimize the pressure drop.

Inlet ports or passages 18 and 20 communicate with a cavity or chamber 22. Ports 18 and 20 are positioned such that the longitudinal axis of each is in a common plane, such as the plane of the section as illustrated through the housing 24 of the valve 10. For purposes of explanation, the inlet ports 18 and 20 may be considered to be located in the inlet or upstream section of the valve 10. In the outlet or downstream section of the housing 24, there is mounted opposed outlet ports 26 and 28 each having a longitudinal axis lying in the same plane as the longitudinal axis of the ports 18 and 20. The outlet ports 26 and 28 communicate with the cavity 22 and provide a passage to individual attitude control jets for an air or space vehicle (not shown).

Pivotally mounted within the cavity 22 of the housing 24 to rotate about an axis perpendicular to the plane of the paper is a flapper 30. Flapper 30 has a rounded lower end section that terminates in diverging surfaces 32 and 34. The angle of the surfaces 32 and 34 with respect to a longitudinal axis through the flapper 30 and the position of the ports 26 and 28 are fixed such that, with the flapper in the position shown, the surface 32 caps off the opening of the port 26 and with the flapper 30 in its other extreme position the surface 34 caps off the port 28.

In the inlet or upstream section of the cavity 22, the flapper 30 includes opposed shaped poppets 36 and 38, as also illustrated in FIGS. 2 through 4. With the poppets 36 and 38 positioned on the flapper 30 as shown, the inlet ports 18 and 20 are required to be located at an angle with respect to the horizontal to compensate for the arc of travel for the poppets. A fluid stream emitting from the ports 18 and 20 impinges on the poppets 36 and 38, respectively, and produces a force moment about the pivot point of the flapper 30 to cause a centering thereof.

To reduce the reaction thrust on the flapper 30 by fluid flowing from the ports 18 and 20, the upper section 40 of the flapper 30 immediately below the poppets 36 and 38 is shaped as illustrated. Referring to FIG. 4, the section 40 has a cross-section generally resembling a lozenge although other airfoil configurations will provide somewhat the same result. By shaping the section 40 of the flapper 30, a fluid steam from the ports 18 and 20 will flow smoothly around the flapper thereby producing a minimum of reaction thrust.

To position the flapper 30, an actuator 42 is coupled to the pivot shaft 44 of the flapper. Although any of many commercially available actuators may be used to position the flapper 30, the actuator illustrated is of the type generally known as an "E-core" transducer. The E-core actuator includes windings 46 and 48 selectably energized by signals from the valve controller 14. With reference to the view of FIG. 3, energizing the winding 46 generates a magnetic flux thereby producing a force on a bar 50 to rotate that flapper 30 counterclockwise. A signal energizing the winding 48 will cause the bar 50 to be rotated clockwise, thereby causing the flapper 30 to also rotate clockwise. Since the view of FIG. 3 is from the back as shown in FIG. 1, energizing the winding 48 will position the flapper 30 in the position illustrated in FIG. 1.

Heretofore, the torque required to be produced by the actuator 42 was disproportionate to the valve size because of the forces on the flapper 30 that had to be overcome. As mentioned, an important feature of the present invention is the use of the shaped poppets 36 and 38 to cause the flapper 30 to be self-centering. This self-centering feature of the flapper 30 is accomplished by producing a force moment at the poppets 36 and 38 that balances the opposing force moment produced by a fluid flowing through the outlet ports 26 and 28. It is generally known that as a fluid flows from a cavity through an outlet port that a force moment is produced on the flapper 30 about the pivot shaft 44. This moment increases as the flapper 30 moves to one of its end positions and may be calculated by multiplying the pressure differential between the cavity and the outlet port by the area of the port.

Referring to FIG. 5, the reaction torque produced on the flapper 30 by a flow from the cavity 22 through one of the outlet ports is a function of position of the flapper 30 as shown by the curve 52. Without the poppets 36 and 38, the actuator 42 would be required to produce a rotating torque greater than given by the curve 52. By positioning the shaped poppets in the stream from the inlet ports, an opposing reaction torque or force moment is generated on the flapper 30. This opposing torque is illustrated by the curve 54 of FIG. 5. Since the reaction torque at the poppets is the reverse of a reaction torque at the outlet ports, the actuator 42 sees the net difference as given by the curve 56. Now, the actuator 42 need only produce a torque sufficient to exceed the force given by the curve 56.

To determine the outline of the poppets 36 and 38 to produce a net force as given by curve 56, the desired torque to be generated by the poppets as given by curve 54 is calculated by dividing the desired torque at each position of the flapper 30 by the moment arm and the pressure between the inlet port and the cavity to determine the area of the poppet at that position. In the embodiment shown, the poppets have an outline generally resembling a cone with the base of the opposing cones juxtapositioned.

To illustrate the balancing forces produced on the flapper 30, an example is presented. With the flapper 30 in the position illustrated in FIG. 1, the force generated by a fluid stream directed to the poppets 36 and 38 in this extreme position is given by the equation:

$$F_1 = (0.20\ P_s)\ A_1 - C_f(0.20\ P_s)\ A_1\ (1-\cos\theta) \quad (1)$$

where
$P_s$ = the pressure in the pipe 15,
$A_1$ = the area of the inlet ports 18 and 20,
$\theta$ = the deflection angle of the fluid stream over the poppet, and
$C_f$ = the thrust coefficient of the fluid stream as given by the equation:

$$C_f = \sqrt{\left(\frac{2r^2}{r-1}\right)\left(\frac{2}{r+1}\right)^{\frac{r+1}{r-1}}\left[1-\left(\frac{P_2}{P_1}\right)^{\frac{r-1}{r}}\right]} \quad (2)$$

where
$r$ = the specific heat ratio.

Assuming a 20 percent pressure drop across the inlet ports, $r = 1.27$, the fraction $P_2/P_1 = 0.80$, and $\theta = 10°$, then the net force produced by the upstream section on the flapper 30 will be:

$$F_1 = 0.20\ P_s A_1 - 0.44\ (0.20\ P_s)\ A_1\ (1\text{-cos }10°) \quad (3)$$
$$= 0.20\ P_s A_1 - 0.0018\ P_s A_1$$
$$\cong 0.20\ P_s A_1.$$

If the remainder of the supply pressure is considered to be dropped across the outlet port, then a force on the flapper 30 at the outlet ports will be given by the equation:

$$F_2 = 0.80\ P_s A_2 \quad (4)$$

where $A_2$ = the area of the outlet port.

To balance the forces on the flapper 30 to cause centering thereof, the following equation must hold:

$$F_2 R_2 - F_1 R_1 = 0,\ \text{or} \quad (5)$$
$$F_2 R_2 = F_1 R_1$$

where $R_1$ and $R_2$ are the moment arms for the forces $F_1$ and $F_2$, respectively, which can be written as:

$$F_2/F_1 = R_1/R_2. \quad (6)$$

Using the above expressions at (3) and (4) for $F_1$ and $F_2$ equation (6) reduces to:

$$0.80\ P_s A_2/0.20\ P_s A_1 = R_1/R_2. \quad (7)$$

According to equation (7), if the area of the outlet ports equals the area of the inlet ports, to balance the force moments on the pivot shaft 44, the ratio of $R_2/R_1$ must equal 4.

The above example assumes ideal conditions for the valve operation. As a practical matter, a net positive force may be desirable to assure positive positioning of the flapper 30 when energizing the actuator 42.

While only one embodiment of the invention, together with modifications thereof, has been described in detail herein and shown in the accompanying drawings, it will be evident that various other modifications are possible.

What is claimed is:

1. A fluid control valve comprising:
   a housing having a cavity therein with an inlet section and an outlet section,
   opposed inlet ports communicating with the cavity of said housing in the inlet section thereof,
   opposed outlet ports communicating with the cavity of said housing in the outlet section thereof,
   a flapper pivotally mounted in the cavity of said housing for providing controlled communication of a fluid between said cavity and said outlet ports, and
   opposed shaped poppets as part of said flapper positioned in the fluid stream from respective inlet ports to produce a force moment around the flapper pivot to cause a centering thereof against a force moment produced on said flapper by fluid flowing through said outlet port.

2. A fluid control valve as set forth in claim 1 wherein said flapper includes an airfoil shaped portion in the area of said opposed poppets to reduce the reaction torque produced by a fluid emitting from said inlet ports and impinging on said flapper.

3. A fluid control valve as set forth in claim 2 wherein said shaped portion has a cross-section generally defined by a lozenge.

4. A fluid control valve as set forth in claim 1 where each of said opposed poppets has an outline generally resembling a cone with the base of the opposed cones juxtapositioned.

5. A fluid control valve as set forth in claim 1 including actuator means coupled to said flapper for positioning around the pivotal mounting to cap off one of said outlet ports.

6. A fluid control valve comprising:
   a housing having a cavity herein with an inlet section and an outlet section,
   a pair of opposed inlet ports each having a longitudinal axis lying in a given plane and communicating with the cavity of said housing in the inlet section thereof,
   a pair of opposed outlet ports each having a longitudinal axis lying in the same plane as said inlet ports, and communicating with the cavity of said housing in the outlet section thereof,
   a flapper pivotally mounted in said housing on an axis substantially perpendicular to the plane of alignment of said ports for providing controlled communication of a fluid between said cavity and said outlet ports, and
   opposed shaped poppets as part of said flapper positioned in the fluid stream from the pair of opposed inlet ports to produce a force moment around the flapper pivot to cause a centering thereof against a force moment produced on said flapper by fluid flowing through said outlet ports.

7. A fluid control valve as set forth in claim 6 wherein said flapper includes an airfoil shaped section in the area of said opposed poppets to reduce the reaction torque produced by fluid emitting from said inlet ports and flowing past said flapper.

8. A fluid control valve as set forth in claim 7 wherein each of said opposed poppets has an outline generally resembling a cone with the base of the opposed cones juxtapositioned.

9. A fluid control valve as set forth in claim 8 including actuator means for positioning said flapper about the pivotal axis to cap off one of said outlet ports.

* * * * *